July 6, 1954

L. OCHTMAN 2,682,789

REVERSING DRIVE

Filed Aug. 23, 1949

INVENTOR.
LEONARD OCHTMAN
BY
ATTORNEY

July 6, 1954 — L. OCHTMAN — 2,682,789
REVERSING DRIVE

Filed Aug. 23, 1949 — 4 Sheets-Sheet 2

INVENTOR.
LEONARD OCHTMAN
BY
ATTORNEY

July 6, 1954 — L. OCHTMAN — 2,682,789
REVERSING DRIVE

Filed Aug. 23, 1949 — 4 Sheets-Sheet 3

INVENTOR.
LEONARD OCHTMAN
BY
ATTORNEY

July 6, 1954 L. OCHTMAN 2,682,789
REVERSING DRIVE
Filed Aug. 23, 1949 4 Sheets-Sheet 4

INVENTOR.
LEONARD OCHTMAN
BY
ATTORNEY

Patented July 6, 1954

2,682,789

UNITED STATES PATENT OFFICE 2,682,789

REVERSING DRIVE

Leonard Ochtman, Ridgewood, N. J., assignor to Bendix Aviation Corporation, Teterboro, N. J., a corporation of Delaware Application August 23, 1949, Serial No. 111,915

14 Claims. (Cl. 74—768)

The present invention relates to drives and more particularly to reversing drives suitable for operating control surfaces on aircraft.

One object of the present invention is to provide a novel inexpensive reversing drive of simple construction and dependable operation.

Another object of the present invention is to provide a simple reversing drive occupying minimum space so as to make it particularly suitable for aircraft use.

Another object of the present invention is to provide a novel reversing drive adapted to provide a drive member with rotation in either direction from zero to a maximum from a continuously running motor.

Another object of the present invention is to provide a novel reversing drive having extremely rapid operation from one direction to the other.

Another object of the present invention is to provide a novel reversing drive that will limit the torque transmitted.

Another object of the present invention is to provide a novel reversible gearing utilizing a dual friction brake for changing rotation of the output member from one direction to the other.

Another object of the present invention is to provide a novel dual braking arrangement whereby inversely related braking forces are applied to a pair of rotatable members.

The above and other objects and features of the invention will appear more fully hereinafter from a consideration of the following description taken in connection with the accompanying drawing wherein one embodiment of the invention is illustrated by way of example.

Figure 1:
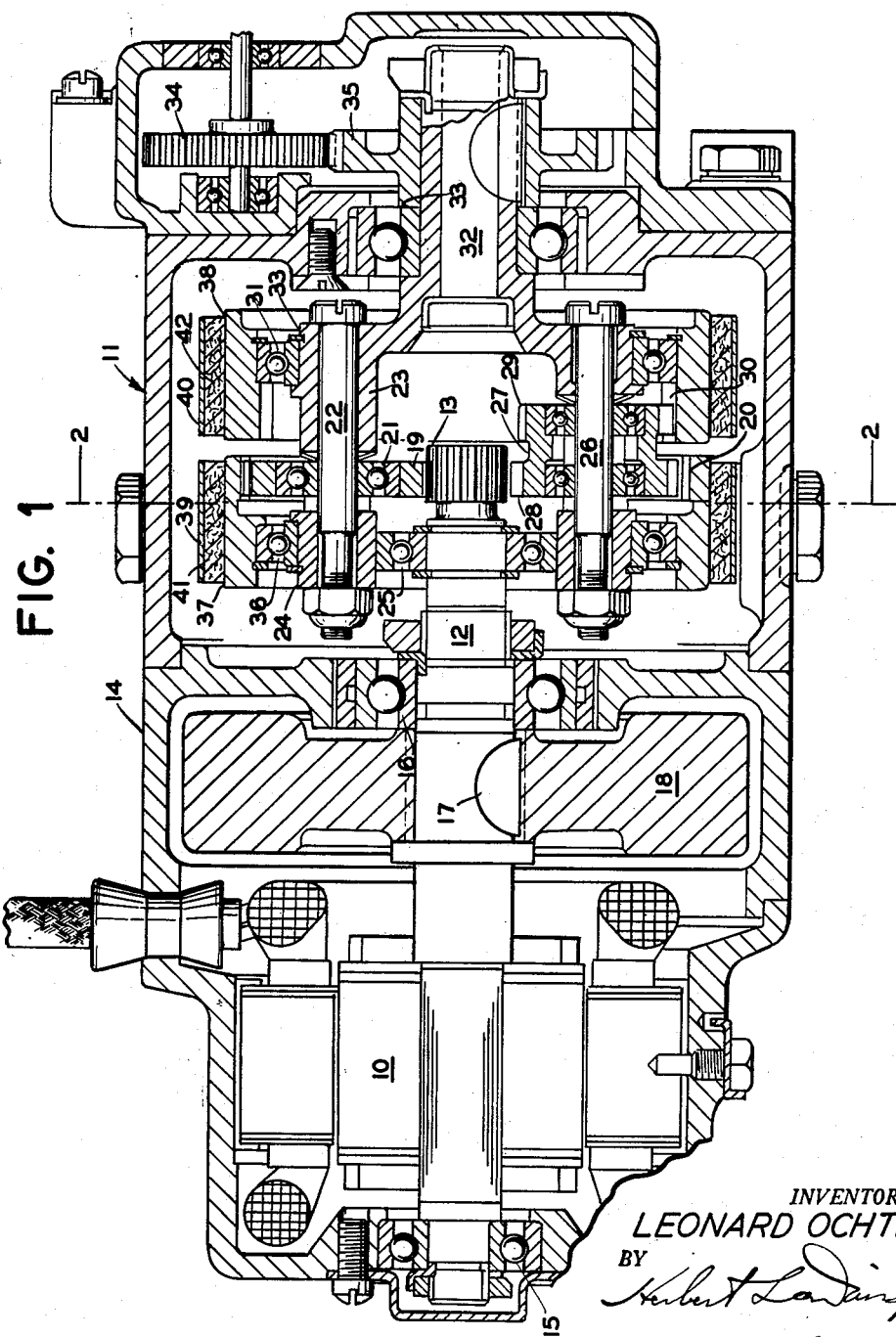
Figure 1 is a view partly in section and partly in elevation of the novel reversing drive.
Figure 2:
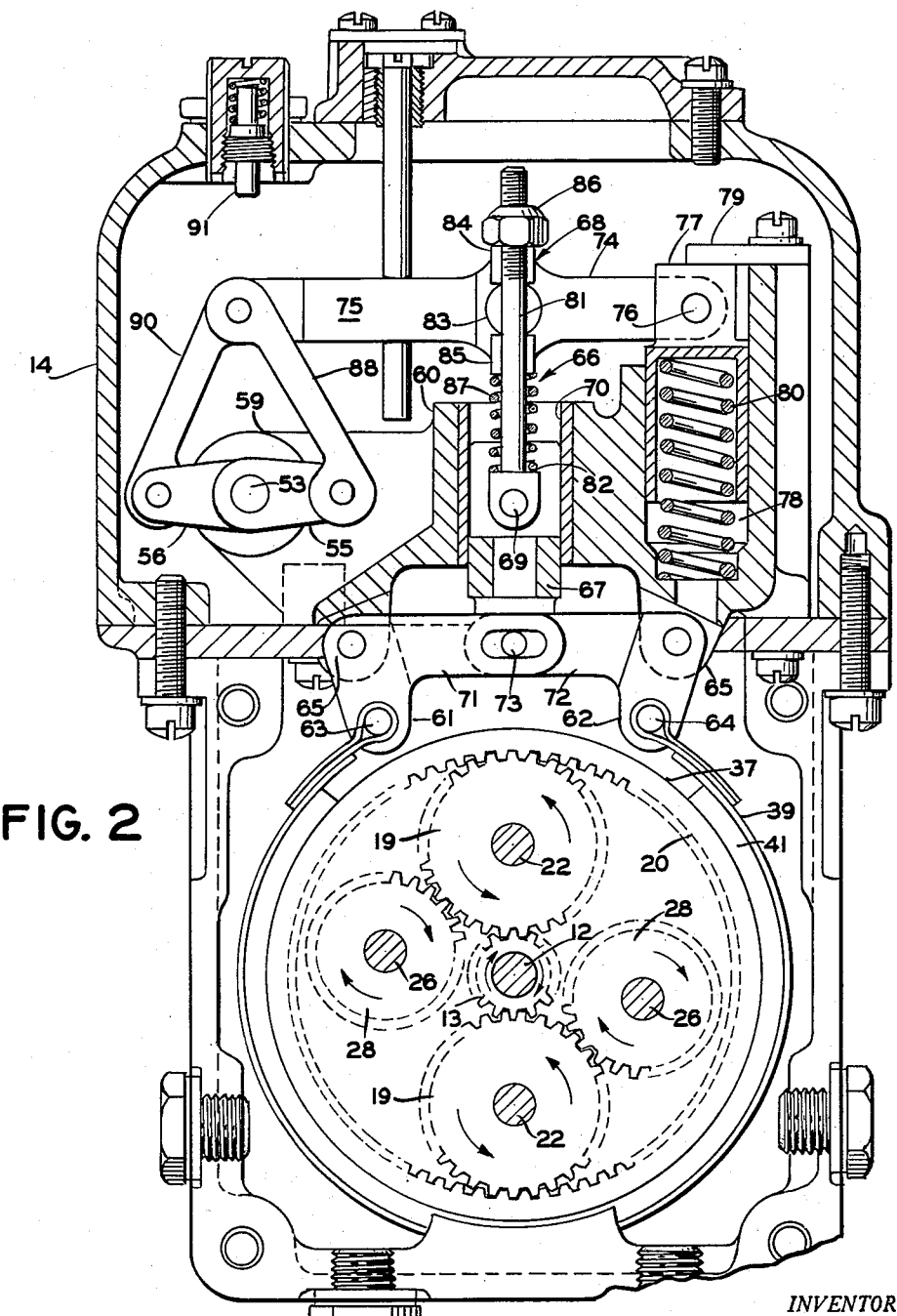
Figure 2 is a view taken along the line 2—2 of Figure 1 showing one part of the novel braking arrangement of the present invention.

Referring now to Figure 1, a motor 10 is shown as driving the reversing drive generally indicated at 11 through a drive shaft 12 terminating in a pinion or sun gear 13 and journaled to housing 14 by ball bearings 15 and 16. Mounted on shaft 12 and keyed thereto by a key 17 is a flywheel or inertia member 18. The reversing drive 11 comprises a planetary gear system consisting of one or more pinion or planet gears 19 in mesh with sun gear 13 and orbit gear 20. Planets 19 are journaled by ball bearings 21 to shaft 22 carried by a pinion or planet cage 23 and extending through a ring member 24 journaled to shaft 12 by ball bearings 25. Journaled to a shaft 26 carried by cage 23 and extending through ring member 24 are dual pinions 27 comprising gears 28 and 29. As shown in Figure 2, gear 28 meshes with planet gear 19, but is smaller than the planet gear 19 so as to clear the teeth of sun gear 13 and orbit gear 20. Gear 29 meshes with internal gear 30 which is journaled to cage 23 by ball bearings 31. Shown integrally with cage 23 is an output shaft 32 journaled to housing 14 by ball bearings 33, which shaft may drive the load directly or through an intermediate gearing generally indicated at 34 through an output pinion 35.

Orbit gear 20 is shown as journaled to ring member 24 by ball bearings 36 and is provided with an external cylindrical surface or drum 37. Gear 30 is provided with a similar external surface or drum 38. Surrounding drums 37 and 38 are brake bands 39 and 40 respectively adapted to clamp brake shoes 41 and 42 against the respective drums. (See Figure 2.)

Figure 4:
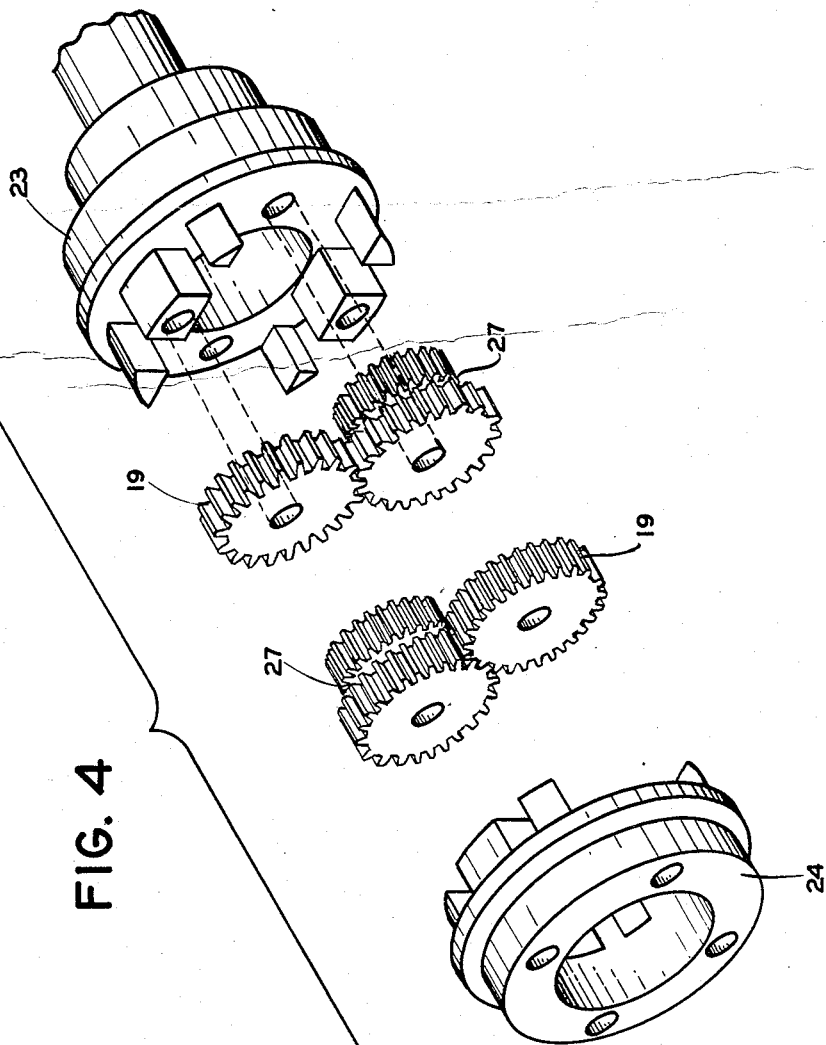
Figure 4 is an exploded view showing the novel arrangement of the planetary gearing structure.

Figure 4 is an exploded view of planetary gear system and illustrates the manner in which the planet cage 23 and ring member 24 coact to form a novel carrier for the planetary gear system.

The operation of the above described reversing drive is as follows:

Motor 10 and flywheel 18 rotate constantly in one direction and drive pinion 13, for instance, in a clockwise direction as indicated in Figure 2. Assuming for the moment that brake band 39 is tightened so as to prevent rotation of orbit gear 20, clockwise rotation of pinion 13 will cause planet 19 to rotate in a counter-clockwise direction so as to revolve in a clockwise direction inside the stationary orbit gear 20, which may be termed a fulcrum gear, thereby rotating cage 23 on which they are mounted in a clockwise sense. Simultaneously with tightening brake band 39, brake band 40 is loosened proportionally in a manner which will hereinafter be described in detail. Pinions 27 and hence gears 29 will be rotated by planets 19 in a clockwise sense and gears 29 will drive internal gear 30 clockwise relative to the spider but as the brake shoes are completely released from drum 38, gear 30 will merely idle and will have no effect on the operation of the drive.

If brake band 40 is tightened to lock internal gear 30 relative to the housing and brake band 39 is loosened to free orbit gear 20, rotation of pinion 13 will be transmitted to output shaft 32 as follows:

Pinion 13 will rotate planet gears 19 counter-clockwise and dual pinions 27 will be rotated in a clockwise direction. As the orbit gear 20 is free to rotate it will have no effect on the operation of the gear but will idle in a counter-clockwise direction. Gear 28 and hence gear 29 will rotate in a clockwise direction but as gear 29 is in mesh with the now stationary internal gear 30 which now acts as a fulcrum gear, the pinion cage 23 and the output shaft 32 will rotate in a counter-clockwise direction or in the direction oppositely to that in which it was rotated when orbit gear 20 was locked and internal gear 30 was free. It is obvious that as brake band 39 is gradually loosened while brake band 40 is gradually tightened, orbit gear 20 will begin to slip as internal gear 30 is retarded until the rotational speed of gears 20 and 30 is equal at which time the output shaft 32 will be stationary, assuming that the gear ratios of the respective drives are equal. A slight change of relative braking action of brakes 39 and 40 will cause the output shaft to rotate slowly in a direction depending on which of the brakes is tightened and which is loosened. It may be found preferable to adjust the relative position of the brake bands 39 and 40 so as to be in neutral position when output shaft 32 is stationary and thus cause rotation in one direction or the other as the braking forces of the brake bands are unbalanced. It is thus seen that by this simple device, output shaft 32 may be rotated from maximum rotation in one direction through zero to maximum rotation in the opposite direction by simply adjusting the relative tension of brake bands 39 and 40. Although the reversing drive was described as being driven by a sun gear 13, it should be obvious that it may, for certain applications, be found preferable to use shaft 32 and gear 35 as the input and sun gear 13 as the output.

Figure 3:
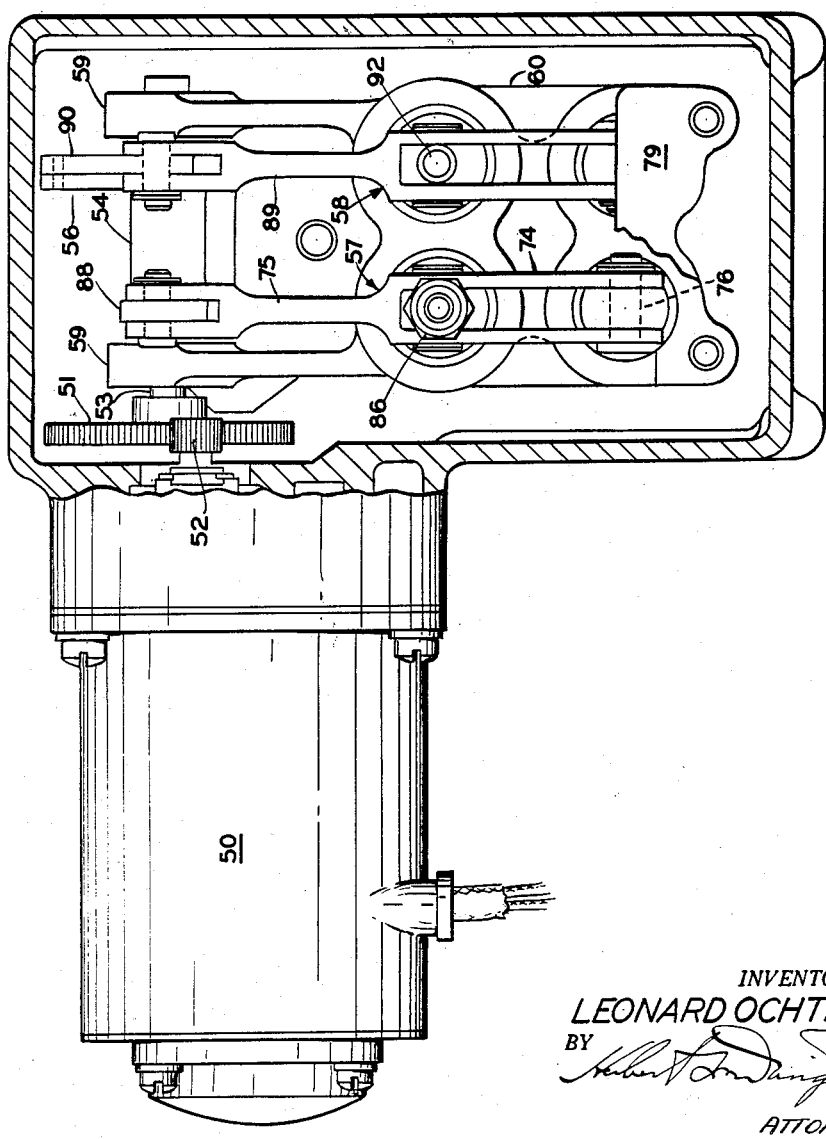
Figure 3 is a view showing the novel braking arrangement partly in section and partly in elevation.

A simple and reliable mechanism for adjusting and manipulating the relative tension of brake bands 39 and 40 is shown in Figures 2 and 3. The braking arrangements of the brake bands are identical and only the one controlling the brake band 39 will be described in detail. The brake mechanism is shown in Figure 3 as being operated by a reversible motor 50 which preferably is of a low inertia type capable of picking up speed rapidly and adapted to drive actuating gear 51 through a pinion 52 in either direction. While it may, of course, be found convenient to turn gear 52 through a simple and hand crank mechanism or the like. Gear 51 is keyed to shaft 53 which carries a sleeve member 54 having a pair of arms 55 and 56 spaced apart along the sleeve and extending therefrom radially diametrically opposite to each other, arm 55 being adapted to operate braking mechanisms 57 of brake band 39 and arm 56 to operate braking mechanism 58 of brake band 40. Shaft 53 is shown as being journaled to lugs 59 extending from brake assembly bracket 60. Brake band 39 is connected to a pair of bell cranks 61 and 62 and by pins 63 and 64 respectively, the bell cranks 61 and 62 being pivoted to lugs 65 extending inwardly from bracket 60 and adapted to be operated by a pull rod 66 consisting of links 67 and 68 pivotally connected together by a pin 69. Link 67 is arranged for vertical movements within guide 70 and the lower end thereof is adapted to engage substantially horizontal arms 71 and 72 of bell cranks 61 and 62 respectively by a pin 73 so that an upward movement of the pull rod 66 will tighten the brake band and a downward movement will loosen it.

Forked end 74 of a brake operating lever 75 is pivoted by a pin 76 to a plunger 77 which is arranged for reciprocating movements in a cylinder 78 and biased against a stop member 79 by a preloaded spring 80. Link 68 consists of a rod 81 extending from a shoulder 82 through a pin 83 journaled for rotation in the forked end 74. Sleeves 84 and 85 surround rod 81 on either side of pin 83 and are held against it by a nut 86 engaging the threaded end portion of the rod 81 and by a spring 87 abutting shoulder 82 respectively. Lever 75 is operated from arm 55 by a link 88. An identical braking mechanism 58 operates brake band 40 through an operating lever 89 through a link 90 from arm 56. Yieldable stop 91, as shown in Figure 2, mounted on housing 14 is arranged to be contacted by the end of link 88 and a similar stop (not shown) is arranged to be contacted by the end of link 90 to limit the upward travel of the links and hence the total rotational movement of shaft 53. The operation of the novel braking arrangement for the reversing drive is as follows:

With the brake adjusting motor 50 in neutral position, i. e., with arms 55 and 56 in horizontal position and with motor 10 running at normal speed brake bands 39 and 40 are preset by adjusting nuts 86 and 92 until the brake bands exert just sufficient drag on orbit gear 20 and internal gear 30 respectively to maintain output shaft 32 substantially stationary. If it is now desired to rotate output shaft 32 in the same direction as motor 10, braking motor 50 is energized to rotate in such a direction as to turn shaft 53 and hence arms 55 and 56 in a counter-clockwise direction as viewed in Figure 2 whereby lever 75 is raised by upward movement of arm 55 and link 88, and lever 89 of brake mechanism 58 is lowered by downward movement of arm 56 and link 90. Pin 83 journaled for rotational movements in lever 75 will bear against sleeve 84 abutting nut 86 to tighten brake band 39 through upward movement of link 68 and 67 and arms 71 and 72 of bell cranks 61 and 62 respectively. Correspondingly brake mechanism 58 will loosen brake band 40 proportionally. Tightening of brake band 39 and loosening of brake band 40 will cause rotation of output shaft 32 in the same direction as the motor 10, as previously described.

Conversely, if it is desired to rotate output shaft 32 in the opposite direction, braking motor 50 is reversed causing clockwise rotation of shaft 53 thereby lowering lever 75 through downward movement of arm 55 and link 88 and raising the corresponding lever 89 of brake mechanism 58 through upward movements of arm 56 and link 90. Downward movement of lever 75 will cause pin 83 to bear against sleeve 85 thereby forcing link 67 and bell crank arms 71 and 72 downwards through biasing spring 87 abutting the sleeve 85 and shoulder 82. Upward movement of lever 75 fulcrumed to plunger 77 will increase the tension on the brake band 39 to a point at which the biasing force of spring 80 against plunger 77 is overcome. Further movement of the shaft will move the plunger 77 away from stop member 79, compressing the spring 80, and thus limiting the amount of tightening which can be applied to the brake and the braking force thereof. In this manner, the brake acts as a torque limiting device for the reversing drive. Stop 91 is adjusted so that link 88 makes contact therewith just after plunger 77 moves away from stop member 79 and prevents further upward movement thereof.

In the manner just indicated stop 91 and the corresponding stop of brake mechanism 58 limit the upward travel of links 88 and 99 respectively and consequently the maximum rotational movement of shaft 53. The braking motor 50 is stalled when the stops are contacted and hold the brakes in their applied position until reversed.

Although only one embodiment of the invention has been illustrated and described, various changes in the form and relative arrangements of the parts may be made to suit requirements.

What is claimed is:

1. A brake system for inversely restraining and freeing an orbit gear and a fulcrum gear for rotation, comprising brake bands in frictional engagement with said orbit gear and said fulcrum gear, an actuating member for each brake band arranged for reciprocating movements, a lever for each of said brake bands, a yieldably supported pivot for each of said levers, said levers being connected for inverse movements to a control member, said actuating members being operated by movements of said lever, said yieldable support being adapted to limit tension on said brake bands to a predetermined value by yielding when such predetermined value is reached.

2. In a reversing drive connecting a pair of shafts, a sun gear mounted on one of said shafts, an orbit gear mounted for rotation; a pinion cage fixed to said other of said shafts, a plurality of sets of intermeshed pinions mounted on said cage, each set having a single pinion and a dual pinion, said dual pinion including a pair of gears, said single pinion being adapted to cooperate as a planet gear with said sun gear and said orbit gear to form a planetary gear system, an internal gear, said dual pinion being out of mesh with said sun gear and said orbit gear and in mesh through one of the gears thereof with said planet gear, an internal gear, said other gear of said dual pinion being adapted to mesh with said internal gear, said orbit gear and said internal gear being mounted for rotation and provided with smooth external surfaces each forming a brake drum, a brake band surrounding each of said brake drums and normally exerting a drag thereon, means for tightening and releasing said brake bands respectively and operated from a single control member, to tighten one brake band while proportionally releasing the other and vice versa, and means for limiting the tension applied to the brake bands thereby providing a torque limiting device for the drive.

3. A reversing drive comprising a plurality of sets of intermeshed pinions, a sun gear, orbit gear, one pinion of each set of intermeshed pinions meshing with said sun gear and said orbit gear so as to cooperate as a planet gear in a planetary gear system, a pinion cage, each pinion of said sets of intermeshed pinions being rotatably mounted on said cage, an internal gear, pinion means in each set of intermeshed pinions meshing in part with the planet gear of said set and in part with said internal gear, said orbit gear and said internal gear being freely rotatable, restraining means normally effective to partially restrain rotation of said orbit gear and said internal gear whereby said orbit and internal gears rotate at equal speed in opposite directions and said cage remains stationary, and means for selectively increasing the effect of said restraining means on either said orbit gear or said internal gear and concurrently relieving the effect thereof on the other whereby said cage is rotated in the direction of rotation of said sun gear or in a direction reverse thereto.

4. In a reversing drive, a sun gear, an orbit gear, a pinion cage, a plurality of sets of intermeshed pinions rotatably mounted on said cage, one pinion of said sets of intermeshed pinions being in mesh with said sun gear and said orbit gear so as to cooperate as a planet gear in a planetary gear system, an internal gear, pinion means in each set of pinions being out of mesh with said sun gear and said orbit gear and meshing in part with the other pinion of said set and in part with said internal gear, interdependent brake means normally operative to partially restrain said orbit and internal gears whereby said orbit and internal gears rotate at equal speed in opposite directions, and a single control member to control said brake means to selectively and gradually restrain said orbit gear while concurrently gradually releasing said internal gear upon movement of said control member in one direction, and to gradually release said orbit gear while concurrently gradually restraining said internal gear by moving said control member in the opposite direction.

5. In a reversing drive, a sun gear, an orbit gear, a pinion cage, a plurality of sets of intermeshed pinions rotatably mounted on said cage, one pinion of said sets of intermeshed pinions being in mesh with said sun gear and said orbit gear so as to cooperate as a planet gear in a planetary gear system, an internal gear, pinion means in each set of pinions being out of mesh with said sun gear and said orbit gear and meshing in part with the other pinion of said set and in part with said internal gear, interdependent brake means normally effective to supply a partial restraint on said orbit and internal gears and controllable from a single control member to selectively and gradually increase the restraint on said orbit gear while concurrently and gradually releasing the restraint on said internal gear by moving said control member in one direction, and to gradually release said orbit gear while concurrently and gradually increasing the restraint on said internal gear by moving said control member in the opposite direction, said brake means including means for limiting said restraint to a predetermined value thereby providing a torque limiter for the drive in each direction.

6. In a reversing drive a pair of independent fulcrum gears, a gear centrally located within one of said fulcrum gears, a pinion cage, a plurality of sets of intermeshed pinions rotatably mounted on said cage, one pinion of each set of pinions being in mesh with said one of said fulcrum gears and said centrally located gear, pinion means in each set of pinions being out of mesh with said centrally located gear and said one of said fulcrum gears and in mesh in part with the other pinion of said set and in part with said other of said fulcrum gears, a braking system for selectively restraining rotation of said fulcrum gears comprising a rotatable control member, a friction member coacting with each of said fulcrum gears, an actuating member cooperating with each of said friction members and adapted gradually to increase or decrease the friction applied to said fulcrum gears, said control member being adapted in a first position to operate said actuating members and friction members to apply friction to said fulcrum gears whereby said fulcrum gears rotate at equal speed in opposite directions, and adapted upon displacement from said first position to a second or third position to operate said actuating and friction members to gradually increase friction on one or the other of said fulcrum gears while concurrently and gradually decreasing friction on the other gear whereby one or the other of said fulcrum gears is gradually brought to rest and the rotation of the other fulcrum gear is increased, and means cooperating with each actuating member to limit the friction applied to the respective fulcrum gears to a predetermined value.

7. A brake system for a pair of rotatable reaction members for a reversing drive or the like, each reaction member having external brake drums, said brake system comprising a brake band surrounding each of said brake drums and coacting therewith, a bell crank means individual to each of said brake bands, a lever individual to each bell crank means, operating means connecting each bell crank means to each lever, a yieldable support individual to each lever, said levers being pivoted at one end to their respectively yieldable supports, an operating member having spaced oppositely extending arms, a first link connecting one of said arms to one of said levers, a second link connecting the other of said arms to the other of said levers, whereby movement of said operating member in one direction operates said levers to actuate their respective operating means and bell crank means to increase the friction of one of said brake bands on its coacting brake drum and currently moves the other of said brake bands away from its coacting brake drum, and movement of said operating lever in the opposite direction operates said levers to actuate their respective operating and bell crank means to increase the friction of the other of said brake bands on its coacting brake drum, and concurrently move said one brake band away from its coacting brake drum, said yieldable support means effective to limit the friction applied through each of said levers to its respective brake drum.

8. A reversing drive comprising two independently rotatable shafts, one being a driving and the other a driven shaft, cage means fixed to the driven shaft, a driving gear fixed to the driving shaft within said cage means, a plurality of sets of intermeshed pinions carried by said cage means, a rotatable orbit gear, each of said sets of intermeshed pinions including a dual pinion and a single pinion, said single pinion constituting planets in a planetary gearing comprising said driving gear as a sun gear, said planets and said orbit gear, a rotatable internal gear, said dual pinion including a gear portion out of mesh with said driving gear and said orbit gear and partially in mesh with the single pinion, said dual pinion including another gear portion in mesh with said internal gear, interconnected means including adjustable brake members for said orbit and internal gears for exerting in neutral position a slight drag on said orbit gear and said internal gear, and means to selectively actuate said brake members to gradually increase the drag on one while proportionally decreasing the drag on the other and vice-versa whereby constant rotation of said driving gear may be transmitted to said driven shaft gradually from a maximum rotation in one direction through zero rotation to a maximum rotation in the other direction thereof by said interconnected means, said interconnected means also including positive stop means and a spring loaded lever whereby said interconnected means is adapted to limit the torque transmitted to said driven shaft to a preset maximum value.

9. In a reversing drive, a planetary gear system comprising a sun gear, an orbit gear, a planet gear in mesh with said sun gear, a planet cage supporting said planet gear, a fulcrum gear, a dual pinion supported by said cage, said dual pinion having a gear portion partially in mesh with said fulcrum gear and said dual pinion having another gear portion in mesh with said planet gear but out of mesh with said sun gear and said orbit gear, said orbit gear in mesh with said planet gear, and a brake system for inversely restraining and freeing said orbit and fulcrum gears for rotation comprising friction means adapted to arrest rotation of said orbit gear, friction means adapted to arrest rotation of said fulcrum gear, an actuating member for each friction means arranged for reciprocating movements, a lever pivoted to a yieldable support for each of said friction means, said levers being connected to a common control member for inverse movements, whereby a gradual increase of friction of one will proportionately decrease friction of the other, and said yieldable support being adapted to limit the friction applied by each of said friction means to a predetermined value.

10. In a reversing drive, two independently rotatable shafts, one being a driving and the other a driven shaft, cage means fixed to the driven shaft, a sun gear fixed to the driving shaft within said cage means, a plurality of sets of intermeshed pinions carried by said cage means, a rotatable orbit gear, one pinion of each set of intermeshed pinions constituting a planet gear for interconnecting said sun and orbit gears, rotatable gear means, each of said sets of pinions having a dual pinion adapted to interconnect the planet gear of said set and said rotatable gear means, interconnected means normally operative to exert a slight drag on said orbit gear and said rotatable gear means whereby said orbit gear and rotatable gear means rotate at equal speed in opposite directions and said cage means and driven shaft remain stationary, and means to selectively actuate said interconnected means to increase said drag on said orbit gear while gradually concurrently freeing said rotatable gear means to thereby rotate said cage and driven shaft in one direction or to increase the drag on said rotatable gear means and gradually and concurrently freeing said orbit gear to thereby rotate said cage and shaft in a reverse direction.

11. A reversing drive comprising a sun gear, an orbit gear, a cage, a planet gear and a dual pinion gear mounted for rotation on said cage in fixed relation with said cage and each other, a rotatable internal gear, said planet gear meshing with said sun and orbit gears and said dual pinion gear meshing in part with said planet gear and in part with said internal gear, a composite brake means normally operative to partially restrain rotation of said orbit and internal gears whereby said orbit and internal gears rotate at equal speed and in opposite directions and said cage remains stationary, and a single control member operable in a first direction to adjust said composite brake means so as to gradually increase the restraining effect on said orbit gear and concurrently decrease the restraining effect on said internal gear to thereby rotate said cage in a first direction, said control member operable in a second direction to adjust said composite brake means so as to gradually increase the restraining effect on said internal gear and currently decrease the restraining effect on said orbit gear to thereby rotate said cage in a second direction reverse to said first direction.

12. A reversing drive comprising a sun gear, a cage, a plurality of sets of intermeshing pinions carried by said cage, a pair of fulcrum gears, each set of pinions including a planet gear and a dual gear, said planet gear meshing with said sun gear and one of the said fulcrum gears, said dual gear having a gear meshing with said planet gear and another gear meshing with the other of said fulcrum gears, each of said fulcrum gears being normally freely rotatable, braking means for said fulcrum gears, a single control member operable in one position to adjust said braking means on said fulcrum gears to partially restrain said fulcrum gears whereby said fulcrum gears rotate at equal speed and in opposite directions and said cage remains stationary, said control member operable in moving from said first position to a second position to adjust said braking means to gradually increase the restraining effect on one of said fulcrum gears and concurrently decrease the restraining effect on the other of said fulcrum gears to thereby rotate said cage in one direction, and said control member operable in moving from said second position through said first position to a third position to adjust said braking means to gradually decrease the restraining effect on said one of said fulcrum gears and concurrently increase the restraining effect on the other of said fulcrum gears to thereby reverse the direction of rotation of said cage.

13. In a reversing drive, a planetary gear system comprising a sun gear, an orbit gear and a planet gear, a cage, said planet gear being rotatably mounted on said cage, a dual pinion gear rotatably mounted on said cage and meshing in part with said planet gear but out of mesh with said sun gear and said orbit gear, an internal gear independent of said planetary gear system, said dual pinion gear meshing in part with said internal gear, a brake system normally effective to partially restrain rotation of said orbit and internal gears whereby said orbit and internal gears rotate at equal speed in opposite directions, said brake system including operator-operative means for increasing the restraint effective on said orbit gear while concurrently permitting free rotation of said internal gear and conversely for permitting free rotation of said orbit gear while increasing the restraint effective on said internal gear whereby said orbit gear is gradually brought to rest and conversely said internal gear is brought to rest, and means for limiting said restraint applied to said orbit and internal gears to a predetermined value.

14. A reversing drive comprising two independently rotatable shafts, one being driving and the other a driven shaft, cage means fixed to the driven shaft, a driving gear fixed to the driving shaft within said cage means, a plurality of sets of intermeshed pinions carried by said cage means, a rotatable orbit gear, one pinion of each of said sets of intermeshed pinions constituting planets in a planetary gearing comprising said driving gear as a sun gear, said planets and said orbit gear, each of said sets of pinions including a dual pinion out of mesh with said driving gear and said orbit gear, a rotatable internal gear, said dual pinion including a gear portion in mesh with said one pinion and another gear portion in mesh with said internal gear, interconnected means including adjustable brake members for said orbit and internal gears for exerting in neutral position a slight drag on said orbit gear and said internal gear whereby during constant rotation of said driving gear in one direction said driven shaft remains stationary, and means for selectively moving said interconnected means from said neutral position to a first predetermined position and from said first predetermined position through said neutral position to a second predetermined position, said interconnected means effective on movement from the neutral position thereof toward said first predetermined position to gradually increase the drag of one of said brake members and concurrently and proportionately decrease the drag of the other brake member whereby the constant rotation of said driving gear in one direction is transmitted to said driven shaft to rotate said driven shaft from the stationary position thereof to maximum rotation in a first direction, and said interconnected means effective on movement from said first predetermined position through said neutral position toward said second predetermined position thereof to gradually decrease the drag of said one of said brake members and increase the drag on said other of said brake members whereby the constant rotation of said driving gear in said one direction is transmitted to said driven shaft to decrease the rotation thereof from a maximum rotation in said first direction to a stationary position and from said stationary position to a maximum rotation in a direction reverse to said first direction.

References Cited in the file of this patent

UNITED STATES PATENTS

| Number | Name | Date |
| --- | --- | --- |
| 2,009,477 | Clayton | July 30, 1935 |
| 2,088,782 | Ford | Aug. 3, 1937 |
| 2,102,441 | Sloane | Dec. 14, 1937 |
| 2,330,198 | Banker | Sept. 28, 1943 |
| 2,480,136 | Holstein | Aug. 30, 1949 |

FOREIGN PATENTS

| Number | Country | Date |
| --- | --- | --- |
| 372,273 | France | Feb. 15, 1907 |
| 436,753 | Germany | Nov. 8, 1926 |